US012706710B2

(12) United States Patent
Chen et al.

(10) Patent No.: US 12,706,710 B2
(45) Date of Patent: Aug. 11, 2026

(54) METHOD, DEVICE AND COMPUTER PROGRAM PRODUCT FOR WIRELESS COMMUNICATION

(71) Applicant: ZTE Corporation, Shenzhen (CN)

(72) Inventors: Mengzhu Chen, Shenzhen (CN); Focai Peng, Shenzhen (CN); Yuzhou Hu, Shenzhen (CN); Jun Xu, Shenzhen (CN); Qiang Fu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 168 days.

(21) Appl. No.: 18/194,753

(22) Filed: Apr. 3, 2023

(65) Prior Publication Data

US 2023/0261824 A1 Aug. 17, 2023

Related U.S. Application Data

(63) Continuation of application No. PCT/CN2020/121634, filed on Oct. 16, 2020.

(51) Int. Cl.
*H04L 5/00* (2006.01)

(52) U.S. Cl.
CPC .................................. *H04L 5/0048* (2013.01)

(58) Field of Classification Search
CPC ..... H04L 5/0048; H04L 5/001; H04L 5/0023; H04L 27/26025; H04L 5/0053; H04L 5/0078; H04L 5/0098; H04L 27/26136; H04L 5/0096; H04L 27/2613; H04W 68/02; H04W 72/232; H04W 4/14; H04W 4/90; H04W 24/08; H04W 72/0457; H04W 72/231
See application file for complete search history.

(56) References Cited

U.S. PATENT DOCUMENTS

| | | | | |
|---|---|---|---|---|
| 11,539,495 | B2 | 12/2022 | Wu et al. | |
| 12,028,840 | B2 * | 7/2024 | Wu | H04W 24/08 |
| 2020/0084747 | A1 | 3/2020 | Hong | |
| 2020/0137718 | A1 | 4/2020 | Agiwal et al. | |
| 2020/0221508 | A1 | 7/2020 | Huang et al. | |
| 2020/0322918 | A1 | 10/2020 | Shih et al. | |
| 2022/0022141 | A1 * | 1/2022 | Cirik | H04L 5/0051 |
| 2022/0052808 | A1 * | 2/2022 | Shrivastava | H04L 5/0048 |

(Continued)

FOREIGN PATENT DOCUMENTS

| | | | |
|---|---|---|---|
| CN | 108012329 | A | 5/2018 |
| CN | 110730504 | A | 1/2020 |

(Continued)

OTHER PUBLICATIONS

Machine Translation of CN 115868218 A (Year: 2021).*

(Continued)

*Primary Examiner* — Hashim S Bhatti
*Assistant Examiner* — Noah James Sugden
(74) *Attorney, Agent, or Firm* — Crowell & Moring LLP

(57) ABSTRACT

A method for wireless communication includes detection, by a wireless communication node from a network device, of a reference signal or a physical downlink control channel (PDCCH). The reference signal or the PDCCH is used to indicate at least the paging information to the wireless communication node.

16 Claims, 10 Drawing Sheets

(56) References Cited

U.S. PATENT DOCUMENTS

2023/0097949 A1* 3/2023 He .................... H04W 52/0235 370/318
2023/0224861 A1* 7/2023 Al ......................... H04W 76/28 370/329
2023/0292326 A1* 9/2023 Jung ..................... H04L 5/0053
2023/0388089 A1* 11/2023 Kwak ................... H04W 72/04
2024/0049193 A1* 2/2024 Abdelghaffar ........ H04W 76/20
2024/0056986 A1* 2/2024 Jeon ...................... H04W 24/08

FOREIGN PATENT DOCUMENTS

CN 111200870 A 5/2020
CN 111278027 A 6/2020
CN 115868218 A * 3/2023 ............ H04W 68/02
WO WO 2019/192006 A1 10/2019
WO WO 2020/030983 A1 2/2020

OTHER PUBLICATIONS

International Search Report and Written Opinion received for Application No. PCT/CN2020/121634 mailed Jul. 21, 2021 (6 pages).

Intel Corp., "Calculation of Paging Occasion," 3GPP TSG RAN NR Ad-Hoc, R2-1707058, Jun. 29, 2017 (2 pp.).

Extended European Search Report for EP Application No. 20 95 7258.5 mailed May 7, 2024 (11 pages).

ZTE: "Reference signal for RRC Idle and Inactive UEs", 3GPP Draft; R1-2005521, 3rd Generation Partnership Project (3GPP), Mobile Competence Centre; 650, Route Des Lucioles; F-06921 Sophia-Antipolis Cedex, France, vol. RAN WG1, No. e-Meeting; Aug. 17, 2020-Aug. 28, 2020, Aug. 8, 2020, XP052346893, Retrieved from the Internet: URL:https://ftp.3gpp/org/tsg_ran/WG1_RL1/TSGR1_102-e/Docs/RI-2005521.zip RI-2005521 (7 pp.).

Vivo: "PDCCH-based power saving signal/channel design", 3GPP Draft; R1-1908170, 3rd Generation Partnership Project (3GPP), Mobile Competence Centre; 650, Route Des Lucioles; F-06921 Sophia-Antipolis Cedex, France, vol. RAN WG1, No. Prague, CZ; Aug. 26, 2019-Aug. 30, 2019, Aug. 17, 2019, XP051764789, Retrieved from the Internet: URL:http://www.3gpp.org/ftp/tsg_ran/WG1_RL 1/TSGR1_98/Docs/RI-1908170.zip (12 pp.).

Examination Report issued for Canada Patent Application No. 3,193,060 dated Dec. 5, 2024 (5 pp.).

Ericsson, Agenda Item: 6.2.3.1, 3GPP TSG-RAN WG2 #109-e R2-2000336, Electronic meeting, Feb. 24-Mar. 6, 2020, Revision of R2-1914647 (7 pp.).

Moderator (MediaTek), Summary for Potential Power Saving Enhancements, Agenda Item: 8.7.1.1, 3GPP TSG RAN WG1 e-Meeting#102 R1-2007063, Aug. 17-28, 2020 (48 pp.).

Office Action issued for Canada Patent Application No. 3,193,060 dated Oct. 8, 2025 (4 pp.).

Office Action issued for Korea Patent Application No. 10-2023-7011193 dated Sep. 1, 2025 (7 pp.).

Communication issued for EP Patent Application No. 20 957 258.5 dated Jun. 6, 2025 (7 pp.).

Indonesian-language Office Action with machine translation isssued in Indonesian Application No. P00202302894 dated Dec. 31, 2025, (6 pages).

Chinese-language Office Action issued in Chinese Application No. 202080106336.X dated Mar. 24, 2026 with English Translation (12 pages).

* cited by examiner

100 detecting, by a wireless communication node from a network device, a reference signal or a PDCCH 110

FIG. 1

200 detecting, by a wireless communication node from a network device, a reference signal 210

FIG. 2

300 transmitting, by a network device to a wireless communication node, a reference signal or a PDCCH 310

FIG. 3

METHOD, DEVICE AND COMPUTER PROGRAM PRODUCT FOR WIRELESS COMMUNICATION

PRIORITY

This application claims priority as a Continuation of PCT/CN2020/121634, filed on Oct. 16, 2020, entitled "METHOD, DEVICE AND COMPUTER PROGRAM PRODUCT FOR WIRELESS COMMUNICATION", published as WO 2022/077480 A1, the entirety of which is incorporated herein by reference.

TECHNICAL FIELD

The present disclosure is generally directed to wireless communication. In particular, the present disclosure is directed to a method, device, and computer program product for wireless communication. In particular, the present disclosure relates to 5G wireless communication, but not limited thereto.

BACKGROUND

A user equipment (UE) in a radio resource control (RRC) idle/inactive state needs to wake up to detect the physical downlink control channel (PDCCH) for paging downlink control information (DCI) and paging message in the corresponding paging occasion per paging cycle. And to guarantee the performance of paging DCI and paging message, the UE may also need to perform one or more Synchronization Signal/Physical Broadcast Channel block (SSB) measurement(s) to refine the time/frequency synchronization.

However, when there are more than one UEs monitoring the same paging occasion, a false alarming rate of the paging DCI would increase the power consumption of the UEs. Besides, the UE may need to wake up before the paging occasion to measure the SSB, and during the gap between SSB and paging occasion, the UE might not be able to enter deep sleep thus leading to an increase in power consumption.

SUMMARY

The present disclosure relates to methods, devices, and computer program products for wireless communication, that can reduce the power consumption of a wireless communication node. One aspect of the present disclosure relates to a wireless communication method. In an embodiment, the wireless communication method includes: detecting, by a wireless communication node from a network device, a reference signal or a physical downlink control channel, PDCCH. The reference signal or the PDCCH is used to indicate at least the paging information to the wireless communication node.

Another aspect of the present disclosure relates to a wireless communication method. In an embodiment, the wireless communication method includes: detecting, by a wireless communication node from a network device, a reference signal. The reference signal is used by the wireless communication node for synchronization or radio resource management, RRM, measurement.

Another aspect of the present disclosure relates to a wireless communication method. In an embodiment, the wireless communication method includes: transmitting, by a network device to a wireless communication node, a reference signal or a physical downlink control channel, PDCCH. The reference signal or the PDCCH is used to indicate at least the paging information to the wireless communication node.

Another aspect of the present disclosure relates to a wireless communication method. In an embodiment, the wireless communication method includes: transmitting, by a network device to a wireless communication node, a reference signal. The reference signal is used by the wireless communication node for synchronization or radio resource management, RRM, measurement.

Another aspect of the present disclosure relates to a wireless communication node. In an embodiment, the wireless communication node includes a communication unit and a processor. The processor is configured to detect a reference signal or a physical downlink control channel, PDCCH, from the network device, in which the reference signal or the PDCCH is used to indicate at least the paging information to the wireless communication node.

Another aspect of the present disclosure relates to a wireless communication node. In an embodiment, the network device includes a communication unit and a processor. The processor is configured to detect a reference signal from the network device, in which the reference signal is used by the wireless communication node for synchronization or radio resource management, RRM, measurement.

Another aspect of the present disclosure relates to a network device. In an embodiment, the network device includes a communication unit and a processor. The processor is configured to transmit a reference signal or a physical downlink control channel, PDCCH, to a wireless communication node, wherein the reference signal or the PDCCH is used to indicate at least the paging information to the wireless communication node.

Another aspect of the present disclosure relates to a network device. In an embodiment, the network device includes a communication unit and a processor. The processor is configured to transmit a reference signal to a wireless communication node, wherein the reference signal is used by the wireless communication node for synchronization or radio resource management, RRM, measurement.

Various embodiments may implement the features below.

In some embodiments, the reference signal is a Channel State Information Reference Signal, a Tracking Reference Signal, or a Secondary Synchronization Signal.

In some embodiments, a sequence r(m) of the reference signal is presented as follows:

$$r(m)=s(a)\cdot p(b)\cdot q(c)$$

in which s(a), p(b), and q(c) are sequences, at least one of s(a), p(b), or q(c) is a pseudo-random sequence, and m, a, b, c are non-negative integers.

In some embodiments, the sequence q(c) is determined by an exponential function.

In some embodiments, the sequence s(a) is a scrambling sequence composed of {1,−1,j,−j}, or {1,−1}, j being the imaginary unit satisfying j2=−1.

In some embodiments, the sequence p(b) is presented as follows:

$$p(b) = [1 - 2x0((b + m0)\bmod 127)][1 - 2x1((b + m1)\bmod 127)]$$

$$0 \le b < 127$$

in which b, m0 and m1 are non-negative integers, and mod is a modulo function, and x0 and x1 are functions presented as follows:

$$x0(i+7)=(x0(i+4)+x0(i))\bmod 2$$

$$x1(i+7)=(x1(i+1)+x1(i))\bmod 2$$

in which i is a non-negative integer.

In some embodiments, the initialization of the functions x0 or x1 are determined by at least one of the following:

a cell ID of the network device;

a group ID of the wireless communication node;

a higher layer signaling;

an offset of the reference signal;

a duration for a transmission of the reference signal;

a number of transmission times corresponding to the reference signal;

a block index corresponding to a synchronization block or the reference signal;

a transmission occasion of a synchronization block or the reference signal;

a Radio Network Temporary Identifier corresponding to the paging information or paging DCI;

a predefined sequence; or a location of a paging period.

In some embodiments, the sequence p(b) is presented as follows:

$$p(b)=\frac{1}{\sqrt{2}}(1-2\cdot c1(2b))+j\frac{1}{\sqrt{2}}(1-2\cdot c1(2b+1))$$

in which c1 is a sequence defined by a pseudo-random sequence presented as follows:

$$c1(i)=(y1(i+N)+y2(i+N))\bmod 2$$

$$y1(i+31)=(y1(i+3)+y1(i))\bmod 2$$

$$y2(i+31)=(y2(i+3)+y2(i+2)+y2(i+1)+y2(i))\bmod 2$$

N is a non-negative number, and y1 and y2 are functions, and mod is a modulo function, j being the imaginary unit satisfying j2=−1.

In some embodiments, the initialization of the function y1 or y2 is determined by at least one of the following:

a cell ID of the network device;

a group ID of the wireless communication node;

a higher layer signaling;

an offset of the reference signal;

a duration for a transmission of the reference signal;

a number of transmission times corresponding to the reference signal;

a block index corresponding to the synchronization block or the reference signal;

a transmission occasion of a synchronization block or the reference signal;

a Radio Network Temporary Identifier corresponding to the paging information or paging DCI;

a predefined sequence; or a location of a paging period.

In some embodiments, the reference signal is a sequence mapped to a plurality of resource elements, and a start position of the sequence mapping in the time or frequency domain is determined by at least one of the following:

a higher layer parameter;

an ID of a search space set or a control resource set, where the wireless communication node monitors the paging information or paging DCI;

a group ID of the wireless communication node;

a subcarrier in a common resource block; or a first predefined reference point.

In some embodiments, the reference signal or PDCCH is quasi co-located with a reference source, the reference source includes a Synchronization Signal/Physical Broadcast Channel block determined by a higher layer signaling, a predetermined Synchronization Signal/Physical Broadcast Channel block, or a Synchronization Signal/Physical Broadcast Channel block multiplexing with a Control Resource Set.

In some embodiments, a location of the reference signal or PDCCH in the frequency domain is determined by at least one of the following:

a paging period;

a Control Resource Set;

a Primary Synchronization Signal, a Secondary Synchronization Signal, or a Synchronization Signal/Physical Broadcast Channel block;

an initial Downlink Bandwidth Part;

a paging indication;

a second predefined reference point;

a higher layer signaling; or a group ID of the wireless communication node.

In some embodiments, a subcarrier spacing of the reference signal is identical to at least one of the following:

a subcarrier spacing of a Synchronization Signal/Physical Broadcast Channel block;

a subcarrier spacing of an initial Downlink Bandwidth Part; or a subcarrier spacing of at least one of a System Information Block 1, a message for initial access, or a paging and broadcast system information message.

In some embodiments, a number of resource blocks of the reference signal or PDCCH is determined by at least one of the following:

a Control Resource Set;

a Primary Synchronization Signal, a Secondary Synchronization Signal, or a Synchronization Signal/Physical Broadcast Channel block;

an initial Downlink Bandwidth Part;

a paging indication; or a higher layer parameter.

In some embodiments, a location of the reference signal or PDCCH in the time domain is determined by at least one of the following:

a paging period;

a paging search space;

a Primary Synchronization Signal, a Secondary Synchronization Signal, or a Synchronization Signal/Physical Broadcast Channel block;

an initial Downlink Bandwidth Part;

a paging indication;

a third predefined reference point; or a higher layer signaling.

In some embodiments, the location of the reference signal or PDCCH in the time domain is determined by one or two offsets relative to the third predefined reference point.

In some embodiments, the location of the reference signal or PDCCH in the time domain is determined by a window corresponding to at least two of a starting position and an end position of the reference signal in the time domain and a duration of the resource of the reference signal in the time domain.

In some embodiments, the third predefined reference point is determined by at least one of the following:

the paging period;

the Primary Synchronization Signal, the Secondary Synchronization Signal, or the Synchronization Signal/Physical Broadcast Channel block;

the paging indication or a resource for the paging indication;

an ID of the wireless communication node or S-Temporary Mobile Subscriber Identity of the wireless communication node;

an ID of the resource of the reference signal; or a group ID of the wireless communication node.

In some embodiments, the location of the reference signal or PDCCH in the time domain is associated with a paging frame.

In some embodiments, the location of the reference signal or PDCCH in the time domain is associated with the paging frame and at least one offset relative to the paging frame.

In some embodiments, the location of the reference signal or PDCCH in the time domain is associated with the paging frame and at least one of the Primary Synchronization Signal, the Secondary Synchronization Signal, or the Synchronization Signal/Physical Broadcast Channel block.

In some embodiments, the location of the reference signal or PDCCH in the time domain is associated with a paging occasion.

In some embodiments, the location of the reference signal or PDCCH in the time domain is associated with the paging occasion and at least one offset relative to the paging occasion.

In some embodiments, the location of the reference signal or PDCCH in the time domain is associated with the paging occasion and at least one of the Primary Synchronization Signal, the Secondary Synchronization Signal, or the Synchronization Signal/Physical Broadcast Channel block.

In some embodiments, the location of the reference signal or PDCCH in the time domain is associated with at least one offset relative to one of the Primary Synchronization Signal, the Secondary Synchronization Signal, or the Synchronization Signal/Physical Broadcast Channel block.

In some embodiments, the location of the reference signal in the time domain is associated with at least one offset relative to the paging indication or a resource for the paging indication.

In some embodiments, the reference signal or PDCCH further includes a paging indicator used to indicate the wireless communication node whether to monitor the paging DCI.

In some embodiments, the reference signal or PDCCH further includes an activation/de-activation/update indicator used to activate or de-activate or update a resource of a configured reference signal or a resource set of the configured reference signal.

In some embodiments, the reference signal or PDCCH further includes a system information notification including at least one of short messages, natural catastrophe warning system notification, or Commercial Mobile Alert System notification.

The present disclosure also relates to a computer program product including a computer-readable program medium code stored thereupon, the code, when executed by a processor, causing the processor to implement a wireless communication method recited in any of foregoing methods.

BRIEF DESCRIPTION OF THE DRAWINGS

The above and other aspects and their implementations are described in greater detail in the drawings, the descriptions, and the claims.

FIG. 1 illustrates a wireless communication method according to an embodiment of the present disclosure;

FIG. 2 illustrates another wireless communication method according to an embodiment of the present disclosure;

FIG. 3 illustrates still another wireless communication method according to an embodiment of the present disclosure;

DETAILED DESCRIPTION

Figure 4:
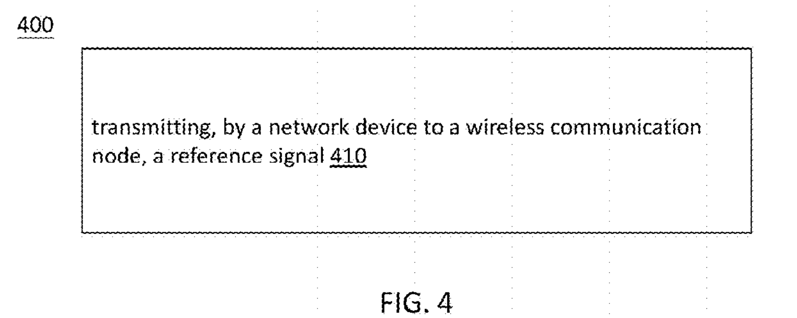
FIG. 4 illustrates still another wireless communication method according to an embodiment of the present disclosure.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

One aspect of the present disclosure is related to a wireless communication method that introduce a reference signal or PDCCH for reducing the power consumption of a wireless communication node.

Figure 1:
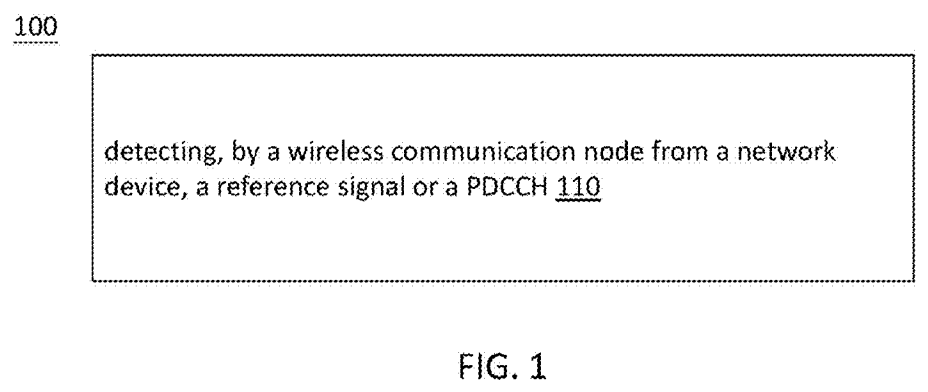

FIG. 1 illustrates a wireless communication method 100 according to an embodiment of the present disclosure. In an embodiment, the wireless communication method 100 may be performed by using a wireless communication node. In the paragraph below, a wireless communication node, such as a UE, will be used in a descriptive example, but the present disclosure is not limited in this regard. Details of the wireless communication node may be ascertained by referring to the paragraphs related to FIG. 15 below.

In an embodiment, the wireless communication method 100 includes operation 110.

In operation 110, the wireless communication node detects, a reference signal or a PDCCH from a network device. The reference signal or the PDCCH is used to indicate at least the paging information to the wireless communication node.

In an embodiment, the paging information may include a paging indication or paging indicator, but is not limited thereto. In an embodiment, the reference signal or the PDCCH may, for example, indicate the operations of the wireless communication node by the paging information, such as whether to detect the paging DCI or paging message or not.

In an embodiment, the reference signal or the PDCCH may include an indicator (e.g., a paging indication or a paging indicator described below) that may refrain the wireless communication node from monitoring the paging occasion. In this manner, it may be avoided that the wireless communication node incorrectly or unnecessarily monitors the paging occasion, and the power consumption of the wireless communication node may be reduced.

Details of the method 100 would be described in the paragraphs below.

Figure 2:
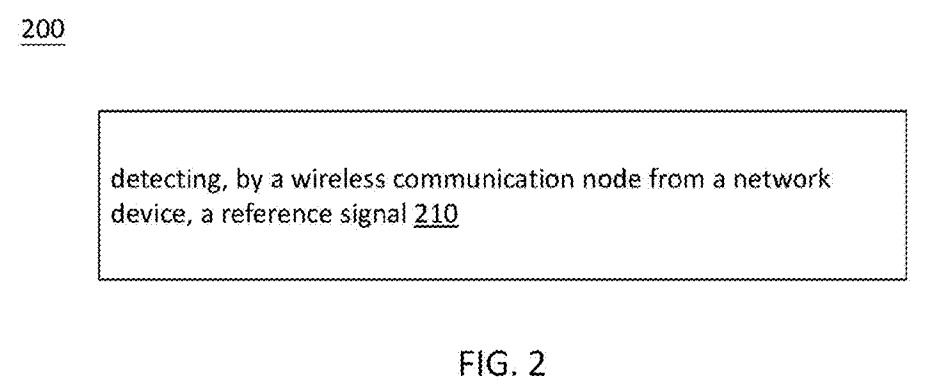

FIG. 2 illustrates a wireless communication method 200 according to an embodiment of the present disclosure. In an embodiment, the wireless communication method 200 may be performed by using a wireless communication node. In the paragraph below, a wireless communication node, such as a UE, will be used in a descriptive example, but the present disclosure is not limited in this regard. Details of the wireless communication node may be ascertained by referring to the paragraphs related to FIG. 15 below.

In an embodiment, the wireless communication method 200 includes operation 210.

In operation 210, the wireless communication node detects, a reference signal from a network device. The reference signal is used by the wireless communication node for synchronization or radio resource management (RRM) measurement.

In an embodiment, the reference signal is detected by the wireless communication node between a measurement of a synchronization block (e.g., Synchronization Signal/Physical Broadcast Channel block, SSB) and a paging period (e.g., a paging frame or a paging occasion or paging time window). In an embodiment, the reference signal is used by the wireless communication node for the time and/or frequency synchronization between the wireless communication node and the network device or RRM measurement, but is not limited thereto. In this manner, a long awake time for the wireless communication node between the measurement of the synchronization block and the paging period may be avoided, and the power consumption of the wireless communication node may be reduced.

In an embodiment, the reference signal may be configured to be received by the wireless communication node with a certain offset before the paging period.

In an embodiment, the reference signal may be used by the wireless communication node to correct the error in the time or frequency domain between the wireless communication node and the network device. In an embodiment, the reference signal has a format similar or identical to a Channel State Information Reference Signal (CSI-RS), a Tracking Reference Signal (TRS), or a Secondary Synchronization Signal (SSS). In an embodiment, the reference signal includes a sequence mapped into a plurality of resource elements in the time and/or frequency domain.

Details of the method 200 would be described in the paragraphs below.

Figure 3:
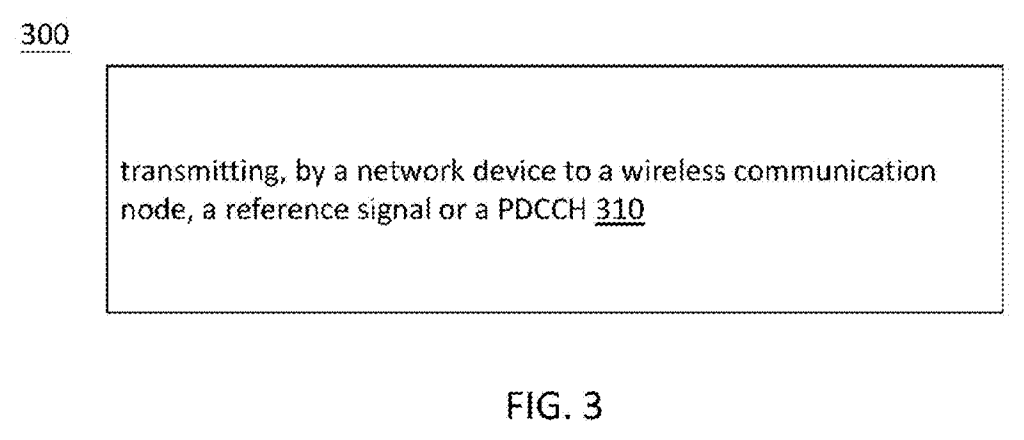

FIG. 3 illustrates a wireless communication method 300 according to an embodiment of the present disclosure. In an embodiment, the wireless communication method 300 may be performed by using a network device. In the paragraph below, a network device, such as a base station (BS), will be used in a descriptive example, but the present disclosure is not limited in this regard. Details of the network device may be ascertained by referring to the paragraphs related to FIG. 16 below.

In an embodiment, the wireless communication method 300 includes operation 310.

In operation 310, the network device transmits a reference signal or a PDCCH to a wireless communication node. The reference signal or the PDCCH is used to indicate at least the paging information to the wireless communication node.

In an embodiment, the paging information may include a paging indication or paging indicator, but is not limited thereto. In an embodiment, the reference signal or the PDCCH may, for example, indicate the operations of the wireless communication node by the paging information, such as whether to detect the paging DCI or paging message or not.

In an embodiment, the paging DCI is a DCI which schedules paging message. In an embodiment, the paging message is used for the notification of one or more UEs which are paged.

In an embodiment, the reference signal or the PDCCH may include an indicator (e.g., a paging indication or a paging indicator described below) that may refrain the wireless communication node from monitoring the paging occasion. In this manner, it may be avoided that the wireless communication node incorrectly or unnecessarily monitors the paging occasion, and the power consumption of the wireless communication node may be reduced.

Details of the method 300 would be described in the paragraphs below.

FIG. 4 illustrates a wireless communication method 400 according to an embodiment of the present disclosure. In an embodiment, the wireless communication method 400 may be performed by using a network device. In the paragraph below, a network device, such as a BS, will be used in a descriptive example, but the present disclosure is not limited in this regard. Details of the network device may be ascertained by referring to the paragraphs related to FIG. 16 below.

In an embodiment, the wireless communication method 400 includes operation 410.

In operation 410, the network device transmits a reference signal to a wireless communication node. The reference signal is used by the wireless communication node for synchronization or RRM measurement.

In an embodiment, the reference signal is used for synchronizing the time and/or frequency between the wireless communication node and the network device or RRM measurement, but is not limited thereto.

In an embodiment, the network device may transmit the reference signal to the wireless communication node between a transmission of a synchronization block (e.g., an SSB) and a paging period (e.g., a paging frame or a paging occasion or paging time window). In an embodiment, the reference signal is used by the wireless communication node for synchronizing the time and/or frequency between the wireless communication node and the network device, but is not limited thereto. In this manner, a long awake time for the wireless communication node between the measurement of the synchronization block and the paging period may be avoided, and the power consumption of the wireless communication node may be reduced.

In an embodiment, the network device may be configured to transmit the reference signal to the wireless communication node with a certain offset before the paging period.

In an embodiment, the reference signal may be used by the wireless communication node to correct the error in the time or frequency domain between the wireless communication node and the network device. In an embodiment, the reference signal has a format similar or identical to a Channel State Information Reference Signal (CSI-RS), a Tracking Reference Signal (TRS), or a Secondary Synchronization Signal (SSS). In an embodiment, the reference signal includes a sequence mapped into a plurality of resource elements in the time and/or frequency domain.

Details of the method 400 would be described in the paragraphs below.

In the following paragraphs, many aspects of the reference signal and PDCCH are described in the exemplary examples below, but the present disclosure is not limited to these examples.

Aspect 1—Sequence Generation

In some embodiments, the reference signal is a Channel State Information Reference Signal (CSI-RS), or a Tracking Reference Signal (TRS), or a Secondary Synchronization Signal (SSS).

In some embodiments, a sequence r(m) of the reference signal is presented as follows:

$$r(m)=s(a)\cdot p(b)\cdot q(c)$$

In the equation above, s(a), p(b), and q(c) are sequences, at least one of s(a), p(b), or q(c) is a pseudo-random sequence, and m, a, b, c are non-negative integers.

In some embodiments, a, b, c are functions of m. For example, a=m. For example, b=m. For example, c=m.

In some embodiments, s(a) and/or q(c) are constant value. For example, s(a) equals to 1. For example, q(c) equals to 1.

In some embodiments, at least one of s(a), p(b), or q(c) is determined by a m-sequence or Zadoff-Chu (ZC) sequence.

In some embodiments, the sequence q(c) is determined by an exponential function.

In some embodiments, the sequence s(a) is a scrambling sequence included by {1,−1,j,−j}, or {1,−1}, wherein j being the imaginary unit satisfying $j^2=-1$. For example, the sequence s(a) may be presented as follows:

$$s(a)=\begin{cases}1, \text{ if } c(i\cdot a)=0,\ c(i\cdot a+1)=0\\ -1, \text{ if } c(i\cdot a)=0,\ c(i\cdot a+1)=1\\ j, \text{ if } c(i\cdot a)=1,\ c(i\cdot a+1)=0\\ -j, \text{ if } c(i\cdot a)=1,\ c(i\cdot a+1)=1\end{cases},$$

in which c(i) is defined by a pseudo-random sequence, and i is a positive integer, j being the imaginary unit satisfying $j^2=-1$.

For another example, the sequence s(a) may be presented as follows:

$$s(a)=\begin{cases}1, \text{ if } c(i\cdot a)=0\\ -1, \text{ if } c(i\cdot a)=1\end{cases},$$

in which c(i) is defined by a pseudo-random sequence, and i is a positive integer, j being the imaginary unit satisfying $j^2=-1$.

For another example, s(a) may be presented as follows:

$$s(a)=\begin{cases}1, \text{ if } c(i\cdot a)=1\\ -1, \text{ if } c(i\cdot a)=0\end{cases},$$

in which 6(i) is defined by a pseudo-random sequence, and i is a positive integer.

In some embodiments, the sequence p(b) is presented as follows:

$$p(b)=[1-2x0((b+m0)\bmod 127)][1-2x1((b+m1)\bmod 127)]$$
$$0\le b<127$$

in which b, m0 and m1 are non-negative integers, and mod is a modulo function, and x0 and x1 are functions presented as follows:

$$x0(i+7)=(x0(i+4)+x0(i))\bmod 2$$
$$x1(i+7)=(x1(i+1)+x1(i))\bmod 2$$

in which i is a non-negative integer.

In some embodiments, the function x0 is initialized as follows:

$$[x0(6)\ x0(5)\ x0(4)\ x0(3)\ x0(2)\ x0(1)\ x0(0)]=[0\ 0\ 0\ 0\ 0\ 0\ 1]$$

In some embodiments, the function x1 is initialized as follows:

$$[x1(6)\ x1(5)\ x1(4)\ x1(3)\ x1(2)\ x1(1)\ x1(0)]=[0\ 0\ 0\ 0\ 0\ 0\ 1]$$

In some embodiments, the sequence p(b) is presented as follows:

$$p(b)=\frac{1}{\sqrt{2}}(1-2\cdot c1(2b))+j\frac{1}{\sqrt{2}}(1-2\cdot c1(2b+1))$$

in which j is the imaginary unit satisfying $j^2=-1$, and c1 is a sequence defined by a pseudo-random sequence presented as follows:

$$c1(i) = (y1(i+N) + y2(i+N))\bmod 2$$

$$y1(i+31) = (y1(i+3) + y1(i))\bmod 2$$

$$y2(i+31) = (y2(i+3) + y2(i+2) + y2(i+1) + y2(i))\bmod 2$$

in which N is a non-negative number, and y1 and y2 are functions, and mod is a modulo function. In an embodiment, N is equal to 1600, but is not limited thereto.

In some embodiments, y1 is initialized with y1(0)=1, y1(i)=0, i=1, 2, . . . , 30.

In some embodiments, the initialization of y2 is denoted by $$c0 = \sum_{i=0}^{30} y2(i) \cdot 2^i,$$

in which c0 is a value.

In some embodiments, the initialization of y1, y2, x0, and/or x1 and/or the value of c0, m0, m1 is determined by at least one of the following:

a cell ID of the network device;

a group ID of the wireless communication node;

a higher layer signaling;

an offset of the reference signal;

a duration for a transmission of the reference signal;

a number of transmission times corresponding to the reference signal;

a block index corresponding to a synchronization block or the reference signal;

a transmission occasion of a synchronization block or the reference signal;

a Radio Network Temporary Identifier (RNTI) corresponding to the paging information or paging DCI;

a predefined sequence; or a location of a paging period.

In some embodiments, the group ID is determined by at least one of the paging probability or the ID of the wireless communication node.

In some embodiments, the higher layer signaling is a system information.

In some embodiments, the offset is the gap between the reference signal and a paging period. In some embodiments, the offset is the gap between the reference signal and a Synchronization block. In some embodiments, the Synchronization block includes Synchronization Signal/Physical Broadcast Channel (SS/PBCH) block. In some embodiments, the SS/PBCH block also refers to as SSB.

In some embodiments, the duration is the transmission duration of the reference signal.

In some embodiments, the number of transmission times is the number of transmission times of the reference signal. In some embodiments, the number of transmission times is the maximum number of transmission times of the reference signal.

In some embodiments, the block index includes the block index of a SS/PBCH block. In some embodiments, the reference signal is associated with the SS/PBCH block. For example, the reference signal is quasi co-located with the SS/PBCH block. In some embodiments, the block index includes the block index of the reference signal.

In some embodiments, the transmission occasion includes the symbol number that the reference signal is transmitted within a slot. In some embodiments, the transmission occasion includes the slot number that the reference signal is transmitted within a radio frame. In some embodiments, the transmission occasion includes the system frame number that the reference signal is transmitted. In some embodiments, the transmission occasion includes the symbol number that the SS/PBCH block is transmitted within a slot. In some embodiments, the transmission occasion includes the slot number that the SS/PBCH block is transmitted within a radio frame. In some embodiments, the transmission occasion includes the system frame number that the SS/PBCH block is transmitted. In some embodiments, the reference signal is associated with the SS/PBCH block. For example, the reference signal is quasi co-located with the SS/PBCH block.

In some embodiments, the RNTI is the paging Radio Network Temporary Identifier (P-RNTI). In some embodiments, the RNTI is the RNTI that scrambles that cyclic redundancy check (CRC) bits of a PDCCH which conveys a paging indication. In some embodiments, the RNTI is the RNTI that scrambles that CRC bits of the PDCCH scheduling a paging message.

In some embodiments, the location of the paging period is a predefined or preconfigured symbol or slot or frame of the paging period. In some embodiments, the paging period is a predefined or preconfigured paging period associated with the reference signal. For example, the predefined or preconfigured paging period is the first or last paging period associated with the reference signal. For example, the predefined or preconfigured symbol or slot or frame of the paging period is the first or last symbol, slot, or frame of the paging period.

In some embodiments, the paging period includes at least one of paging occasion, paging frame or paging time window. In some embodiment, the paging occasion is a set of PDCCH occasions where paging DCI can be sent. In some embodiments, paging frame is one Radio Frame and may contain one or multiple PDCCH occasion(s) or starting point of a PDCCH occasion. In some embodiments, the paging time window is a duration within a paging hyper frame, wherein the paging hyper frame comprises one or more discontinuous cycle.

In some embodiments, the initialization of y1, y2, x0, and/or x1 and/or the value of c0, m0, m1 is determined by a group ID of the wireless communication node, an offset of the reference signal, a transmission occasion of a synchronization block or the reference signal, and a location of a paging period.

In some embodiments, the initialization of y1, y2, x0, and/or x1 and/or the value of c0, m0, m1 is determined by a group ID of the wireless communication node, an offset of the reference signal, and a transmission occasion of a synchronization block or the reference signal.

In some embodiments, said c0 may be presented as follows:

$$c0 = \left(2^{10}\left(N_{symb}^{slot} n_{s,f} + l + 1\right)(2n_D + 1) + n_{ID}\right) \bmod 2^{31}$$

or $$c0 = \left(2^{i}\left(N_{symb}^{slot} n_{s,f} + l + 1\right)(2n_D + 1) + j \cdot n_{ID} + h\right) \bmod 2^{31}$$

in which $$N_{symb}^{slot}$$

is the number of symbols within in a slot, $n_{s,f}$ is the slot number within a radio frame, l is the frequency-division multiplexing (OFDM) symbol number within a slot, and $n_{ID}$ is determined by higher-layer parameter or cell ID, and i, j, h are non-negative values.

In some embodiments, said c0 may be presented as follows:

$$c0 = \left((n_{ID}+1)\left(\left(A \cdot n_{f,po} + \text{operation}\left(\frac{n_{s,po}}{B}\right)\right)\bmod C + 1\right) \cdot 2^i + n_{ID} + N_{G,ID} \cdot 2^j\right)\bmod 2^{31}$$

in which A, B, C, i, j are non-negative values, $n_{f,po}$ is the frame of the predefined paging occasion associated with the reference signal, $n_{s,po}$ is the slot of the predefined paging occasion associated with the reference signal, and $n_{ID}$ is determined by the higher-layer parameter or the cell ID, $N_{G,ID}$ is the group ID. In some embodiments, the operation in the equation above is a round, floor or ceiling operation.

Aspect 2—Sequence Generation

Figure 5:
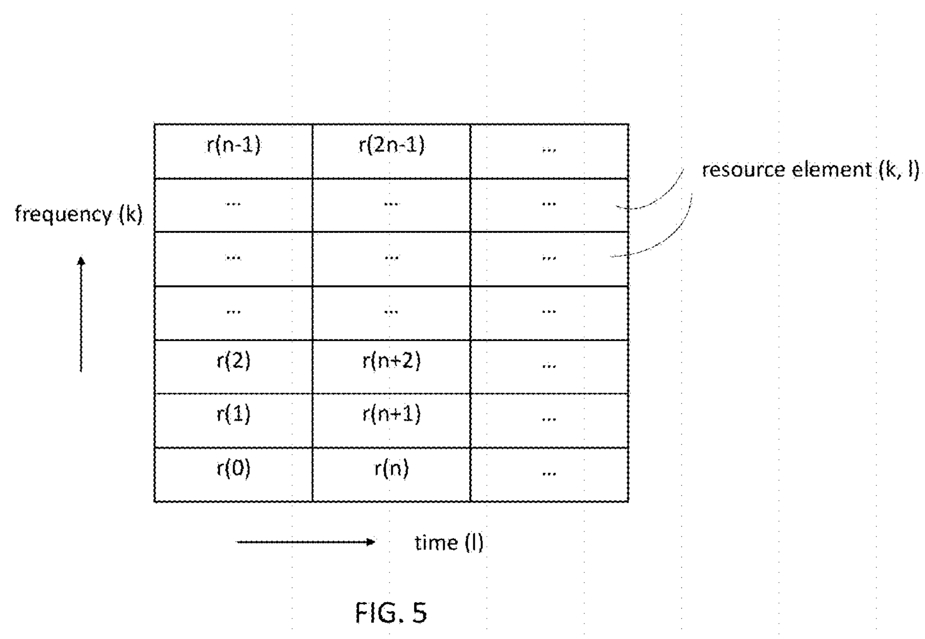
FIG. 5 illustrates a type of sequence mapping according to an embodiment of the present disclosure.

In some embodiments, the reference signal is a sequence mapped to a plurality of resource elements. In some embodiments, the reference signal is a sequence mapped to a plurality of resource elements. In some embodiments, the sequence is mapped to resource element (k,l), in which k is the index in the frequency domain, and l is the symbol position in the time domain, and k and l are non-negative integer. In some embodiments, the sequence mapping starts with r(0) in increasing order of first the frequency domain then the time domain as shown in FIG. 5.

Figures 6, 7:
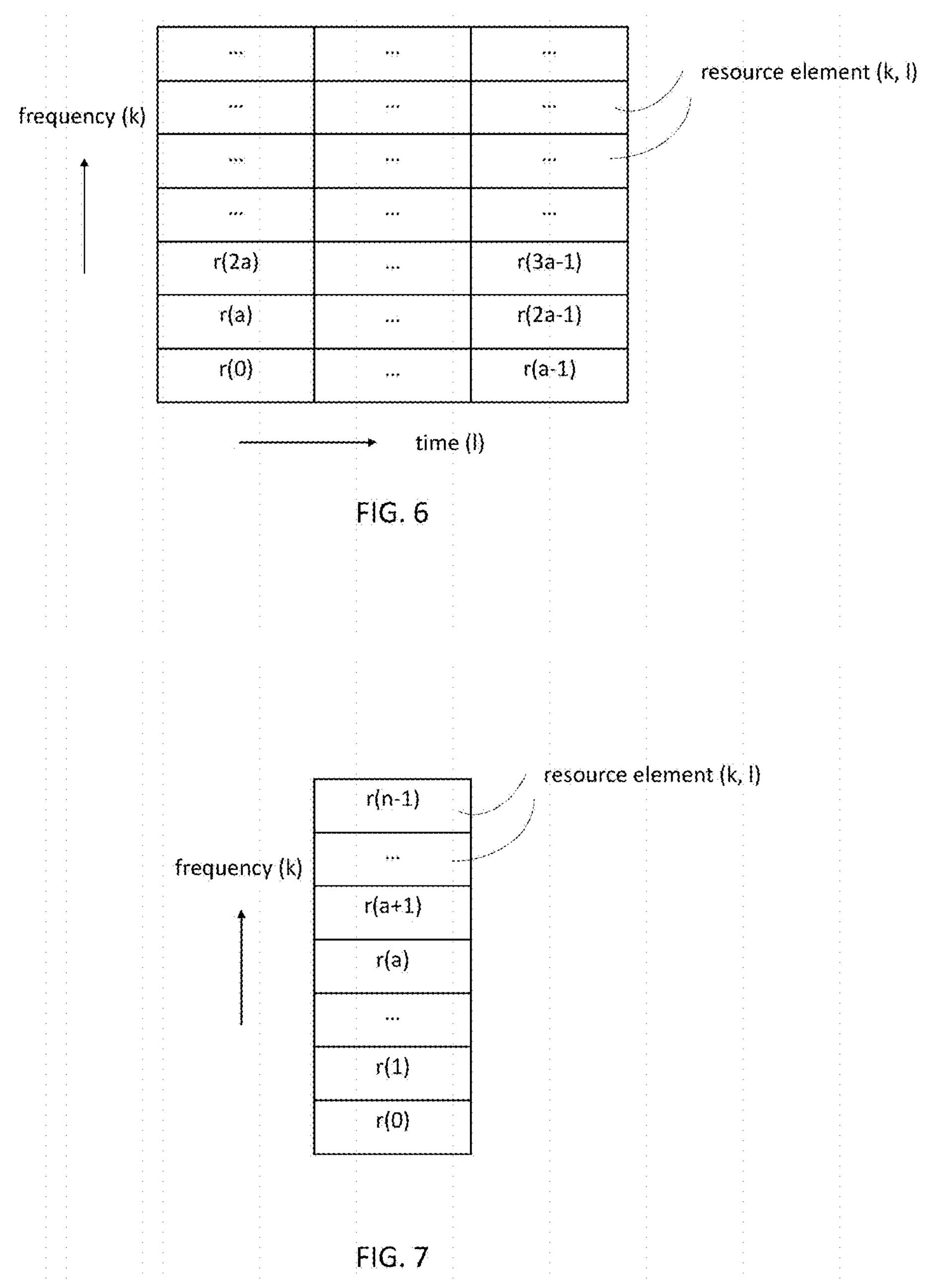
FIG. 6 illustrates another type of sequence mapping according to an embodiment of the present disclosure.
FIG. 7 illustrates still another type of sequence mapping according to an embodiment of the present disclosure.

In some embodiments, the sequence mapping starts with r(0) in increasing order of first the time domain then the frequency domain, as shown in FIG. 6.

In some embodiments, the sequence is mapped to resource element (k,l) increasing order of k, as shown in FIG. 7.

In some embodiments, the wireless communication node needs a reference position for r(0) in the time and/or frequency domain, such as a start position of the sequence mapping in the time or frequency domain, to detect the sequence. In an embodiment, the start position of the sequence mapping in the time or frequency domain is determined by at least one of the following:

a higher layer parameter;

an ID of a search space set or a control resource set, where the wireless communication node monitors the paging information or paging DCI;

a group ID or UE ID of the wireless communication node;

a subcarrier in a common resource block; or a first predefined reference point.

In some embodiments, the higher layer parameter is conveyed by a system information block. In some embodiments, if a higher layer parameter is not configured, the start position of the sequence mapping is a first type of reference point. If a higher layer parameter is configured, the start position of the sequence mapping is a second type of reference point. In some embodiments, if a higher layer parameter is set to a first state, the start position of the sequence mapping is a first type of reference point. If a higher layer parameter is set to a second state, the start position of the sequence mapping is a second type of reference point.

In some embodiments, if the ID of the search space set/control resource set where the wireless communication node monitors paging information or paging DCI is zero, the start position of the sequence mapping is a first type of reference point. If the ID of the search space set or the control resource set where the wireless communication node monitors the paging information or paging DCI is not zero, the start position of the sequence mapping is a second type of reference point.

In some embodiments, the start position of the sequence mapping is associated with the group ID or UE ID.

In some embodiments, the first predefined reference point is predefined or configured by a higher layer parameter.

In some embodiments, the first predefined reference point is associated with Control Resource Set (CORESET) 0 or initial downlink (DL) Bandwidth Part (BWP) or SSB. In some embodiments, the predefined reference point is the subcarrier 0 of the lowest-numbered resource block of CORESET 0 or the subcarrier 0 of the lowest-numbered resource block of the initial DL BWP or the lowest subcarrier of PSS, SSS, or PBCH or the highest subcarrier of PSS/SSS/PBCH.

In some embodiments, the first type of reference point is associated with Control Resource Set (CORESET) 0 or initial downlink (DL) Bandwidth Part (BWP) or SSB. In some embodiments, the first type of reference point is the subcarrier 0 of the lowest-numbered resource block of CORESET 0 or the subcarrier 0 of the lowest-numbered resource block of the initial DL BWP or the lowest subcarrier of PSS, SSS, or PBCH or the highest subcarrier of PSS/SSS/PBCH.

In some embodiments, the second type of reference point is associated with Control Resource Set (CORESET) 0 or initial downlink (DL) Bandwidth Part (BWP) or SSB. In some embodiments, the second type of reference point is the subcarrier 0 of the lowest-numbered resource block of CORESET 0 or the subcarrier 0 of the lowest-numbered resource block of the initial DL BWP or the lowest subcarrier of PSS, SSS, or PBCH or the highest subcarrier of PSS/SSS/PBCH.

In some embodiments, if a higher layer parameter is configured, the start position of the sequence mapping is the higher layer parameter, otherwise, the start position of the sequence mapping is the subcarrier 0 in common resource block 0.

In some embodiments, if a higher layer parameter is configured, the start position of the sequence mapping is the first predefined reference point; otherwise, the start position of the sequence mapping is subcarrier 0 in common resource block 0.

In some embodiments, if a higher layer parameter is set to a first state, the start position of the sequence mapping is the first predefined reference point; otherwise, the start position of the sequence mapping is the subcarrier 0 in the common resource block 0.

In some embodiments, the start position of the sequence mapping is determined by the ID of the search space set/control resource set where the wireless communication node monitors paging information or paging DCI.

In some embodiments, if the ID of the search space set/control resource set where the wireless communication node monitors paging information or paging DCI is zero, the start position of the sequence mapping is the subcarrier 0 of the lowest-numbered resource block of CORESET 0, otherwise, the start position of the sequence mapping is the subcarrier 0 in the common resource block 0.

In some embodiments, if the ID of the search space set/control resource set where the wireless communication node monitors paging information is zero, the start position of the sequence mapping is the subcarrier 0 of the lowest-numbered resource block of CORESET 0, otherwise, the start position of the sequence mapping is the first predefined reference point or configured by higher layer signaling.

In some embodiments, the start position of the sequence mapping is determined by the group ID. For example, for the group ID being i, the start position of the sequence mapping is the (i+1)th predefined/configured value, where i is non-negative.

Aspect 3—Spatial Domain

In some embodiments, the reference signal or PDCCH is quasi co-located with a reference source, the reference source includes a SS/PBCH block determined by a higher layer signaling, a predetermined SS/PBCH block, or a SS/PBCH block multiplexing with a CORSET.

In some embodiments, at least one of the reference signal, CORESET of the PDCCH, or the demodulation reference signal (DMRS) port of the PDCCH is quasi co-located (QCL) with a reference source with respect to a QCL type. In some embodiments, at least one of the reference signal, CORESET of the PDCCH, or the DMRS port of the PDCCH corresponds to a reference source.

In some embodiments, the QCL type includes at least one of QCL-Type A, QCL-Type B,QCL-Type C or QCL-Type D.

In some embodiments, QCL-Type A includes Doppler shift, Doppler spread, average delay, delay spread.

In some embodiments, QCL-Type B includes Doppler shift, Doppler spread.

In some embodiments, QCL-Type C includes Doppler shift, average delay.

In some embodiments, QCL-Type D includes Spatial Rx parameter.

In some embodiments, the SS/PBCH block, and/or the quasi co-location or correspondence relationship is determined by higher layer signaling.

In some embodiments, the SS/PBCH block, and/or the quasi co-location or correspondence relationship is predefined. In some embodiments, the quasi co-location or correspondence relationship is determined by the ID of search space where the wireless communication node monitors the paging information or paging DCI, the ID or position of the reference resource or PDCCH. In some embodiments, the position of PDCCH includes the monitoring occasion of PDCCH.

Figure 8:
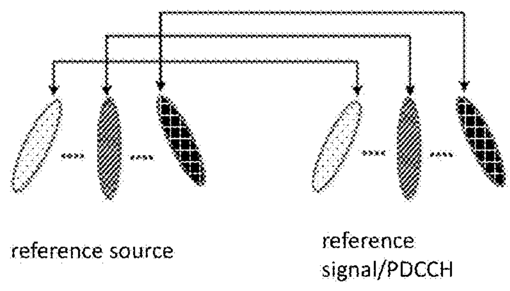
FIG. 8 illustrates a relationship between a reference source and a reference signal resource according to an embodiment of the present disclosure.

In some embodiments, if the wireless communication node monitors the paging information or paging DCI in a search space set with an ID other than zero, the reference source of the k-th reference signal resource within reference signal resource set/block is the k-th SS/PBCH block in which k is a positive number. In some embodiments, the k-th reference signal resource within the reference signal resource set/block is the reference signal resource with the k-th largest ID or smallest ID in the resource set/block. In some embodiments, the k-th reference signal resource within the reference signal resource set/block is the reference signal resource with ID of (k−1). In some embodiments, the k-th reference signal resource within the reference signal resource set/block is determined by higher layer signaling. The relationship between the reference source and the reference signal resource is illustrated in FIG. 8.

In some embodiments, if the wireless communication node monitors the paging information or paging DCI in a search space set with an ID other than zero, the reference source of the k-th reference signal resource is the k-th SS/PBCH block, in which k is a positive number. In some embodiments, the k-th reference signal resource is the reference signal resource with the k-th largest ID or smallest ID. In some embodiments, the k-th reference signal resource is the reference signal resource with ID of (k−1). In some embodiments, the k-th reference signal resource is determined by a higher layer signaling. The relationship between the reference source and the reference signal resource is illustrated in FIG. 8.

In some embodiments, if the wireless communication node monitors the paging information or paging DCI in a search space set with an ID other than zero, the reference source of CORESET of the k-th PDCCH or DMRS port of the k-th PDCCH is the k-th SS/PBCH block, in which k is a positive number. In some embodiments, the k-th PDCCH is determined by a higher layer signaling. In some embodiments, the k-th PDCCH is the PDCCH monitored in the k-th PDCCH monitoring occasion set. Wherein a PDCCH monitoring occasion set comprises one or more PDCCH monitoring occasions. The relationship between the reference source and the PDCCH is illustrated in FIG. 8.

Figure 9:
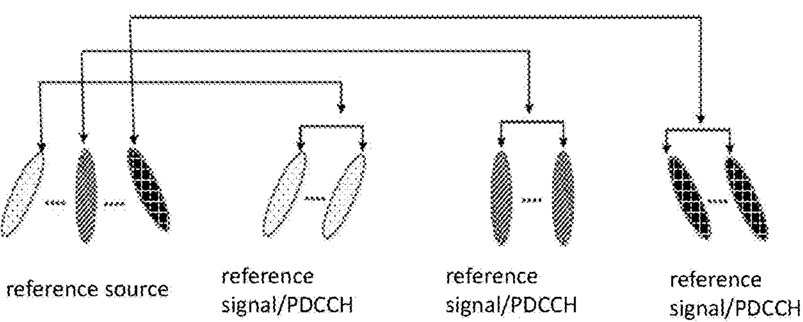
FIG. 9 illustrates still another relationship between a reference source and a reference signal resource according to an embodiment of the present disclosure.

In some embodiments, if the wireless communication node monitors the paging information or paging DCI in a search space set with an ID other than zero, the reference source of k-th reference signal resource set/block is the k-th SS/PBCH block, in which k is a positive number. In some embodiments, the k-th reference signal resource set/block is the reference signal resource set/block with the k-th largest ID or smallest ID. In some embodiments, the k-th reference signal resource set/block is the reference signal resource set/block with ID of (k−1). The relationship between the reference source and the reference signal resource is illustrated in FIG. 9.

In some embodiments, if the wireless communication node monitors the paging information or paging DCI in a search space set with an ID other than zero, the reference source of CORESET of the k-th set of PDCCH or DMRS port of the k-th set of PDCCH is the k-th SS/PBCH block, in which k is a positive number. In some embodiments, the k-th set of PDCCH is determined by a higher layer signaling. In some embodiments, the k-th PDCCH is the PDCCH monitored in the k-th PDCCH monitoring occasion set. Wherein a PDCCH monitoring occasion set comprises one or more PDCCH monitoring occasions. The relationship between the reference source and the PDCCH is illustrated in FIG. 9.

In some embodiments, if the wireless communication node monitors the paging information or paging DCI in a search space set with an ID of zero, the reference source is the SS/PBCH block that multiplexes with the CORESET with ID of zero.

In these embodiments, the spatial information of the reference signal/PDCCH is associated with the paging occasion/paging frame/SSS/PSS/PBCH, the number of UE wake-up times can be reduced to saving power, but the implementation is not limited to thereto.

Aspect 4—Resource in Frequency Domain

In some embodiments, a location of the reference signal or PDCCH in the frequency domain is determined by at least one of the following:

a paging period;

a CORSET (e.g., CORSET 0);

a PSS, a SSS, or a SS/PBCH block;

- an initial DL BWP;
- a paging indication or resource configured for paging indication;
- a second predefined reference point;
- a higher layer signaling; or
- a group ID of the wireless communication node.

In some embodiments, the reference signal/PDCCH is located within CORESET 0 or initial DL BWP. In some embodiments, the wireless communication node is not required to receive the reference signal/PDCCH outside CORESET 0 or initial DL BWP.

In some embodiments, a subcarrier spacing of the reference signal or PDCCH is identical to at least one of the following:

- a subcarrier spacing of the SS/PBCH;
- a subcarrier spacing of the initial DL BWP; or
- a subcarrier spacing of at least one of a System Information Block 1 (SIB1), a message for initial access (e.g., Msg 2/4 for initial access), or a paging and broadcast system information (SI) message; or
- a subcarrier spacing provided by subCarrierSpacingCommon.

In some embodiments, the frequency resource of the reference signal/PDCCH is determined by a start position and number of resource block. In some embodiments, the start position of the frequency resource of the reference signal/PDCCH is relative to a second predefined reference point of at least one of the following:

- the CORSET (e.g., CORSET 0);
- the PSS, the SSS, or the SS/PBCH block;
- the initial BWP;
- the paging indication or resource configured for paging indication; or
- the higher layer signaling.

In some embodiments, the second predefined reference point is configured by a higher layer signaling or predefined.

In some embodiments, the second predefined reference point is a position configured by a higher layer signaling.

In some embodiments, the second predefined reference point is the subcarrier 0 of the lowest resource block of CORESET 0/PSS/SSS/SSB/initial DL BWP/paging indication/resource configured for a paging indication in the frequency domain.

In some embodiments, the second predefined reference point is the center of CORESET 0/PSS/SSS/SSB/initial DL BWP/paging indication/resource configured for a paging indication in the frequency domain.

In some embodiments, the second predefined reference point is the last subcarrier of CORESET 0/PSS/SSS/SSB/initial DL BWP/paging indication/resource configured for a paging indication.

In some embodiments, the start position of the reference signal/PDCCH resource in the frequency domain is at least one of the following:

- a start position configured by a higher layer signaling; or
- a start position of CORESET 0 or SSS or PSS or SS/PBCH or initial DL BWP or paging indication or resource configured for paging indication.

In some embodiments, the start position of the reference signal/PDCCH resource in the frequency domain is a predefined position of CORESET 0 or SSS or PSS or SS/PBCH or initial DL BWP or paging indication or resource configured for paging indication if a predefined condition is fulfilled, otherwise, the start position of the reference signal/PDCCH resource is a start position configured by a higher layer signaling.

In some embodiments, a number of resource blocks of the reference signal or PDCCH is determined by at least one of the following:

- the CORSET (e.g., CORSET 0);
- the PSS, the SSS, or the SS/PBCH block;
- the initial DBP;
- the paging indication or resource configured for paging indication; or
- the higher layer signaling.

In some embodiments, the number of the resource blocks of the reference signal/PDCCH resource is not larger than the number of resource blocks of one of CORESET 0, PSS, SSS, SSB, initial DL BWP or a predefined number.

In some embodiments, the number of the resource blocks of the reference signal/PDCCH resource is the number of resource blocks of one of CORESET 0, PSS, SSS, SSB, initial DL BWP or a predefined number.

In some embodiments, the number of the resource blocks of the reference signal/PDCCH resource is the minimum of number of resource blocks configured by a higher layer signaling and A. In some embodiments, A is a positive number. In some embodiments, A is the number of resource blocks of one of CORESET 0, PSS, SSS, SSB or initial DL BWP. In some embodiments, A is a predefined number.

In some embodiments, the number of the resource blocks of the reference signal/PDCCH resource is (N1+S1−S2) if N2>N1+S1−S2, otherwise, the number of resource block of the reference signal/PDCCH resource is N2. N2 is the number of the resource blocks of the reference signal/PDCCH resource configured by a higher layer signaling, S2 is the start position of the reference signal/PDCCH resource, N1 is the number of resource blocks of the CORESET 0, PSS, SSS, SSB, resource of paging indication or initial DL BWP, S2 is the start position of the CORESET 0, PSS, SSS, SSB, paging indication or initial DL BWP.

In some embodiments, the wireless communication node is configured in a manner assuming that all the reference signal resources are configured with the same starting position in the frequency domain.

In some embodiments, the wireless communication node is configured in a manner assuming that all the reference signal resources are configured with the same number of resource blocks.

In some embodiments, the wireless communication node detects the PDCCH in a predefined search space set type, in which the search space set type is Type2-PDCCH common search space (CSS) set.

In some embodiments, the wireless communication node detects the PDCCH in a primary cell.

In some embodiments, the maximum number of PDCCH candidates for aggregation level L is C, in which L includes 4, 8, or 16 and C includes 4, 2, or 1. The relationship there between is shown in the table 1 below.

TABLE 1

Control Channel Element (CCE) aggregation levels and maximum number of the PDCCH candidates per CCE aggregation level

| CCE Aggregation Level | Number of Candidates |
|---|---|
| 4 | 4 |
| 8 | 2 |
| ≥16 | 1 |

In these embodiments, the frequency information of the reference signal/PDCCH is associated with the paging occasion/paging frame/SSS/PSS/PBCH, the number of UE wake-up times can be reduced to saving power, but the implementation is not limited to thereto.

Aspect 5—Resource in Time Domain

In some embodiments, a location of the resource of the reference signal or PDCCH in the time domain is determined by at least one of the following:

- a paging period;
- a paging search space;
- a PSS, a SSS, or a SS/PBCH block;
- an initial BWP;
- a paging indication or resource configured for paging indication;
- a third predefined reference point; or
- a higher layer signaling.

In some embodiments, the location of the reference signal or PDCCH in the time domain is determined by one or two offsets relative to the third predefined reference point.

Figure 10:
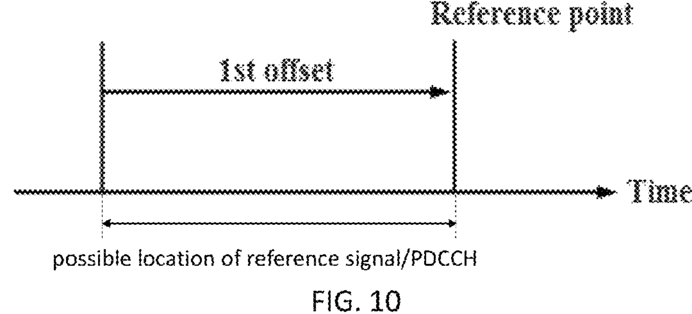
FIG. 10 illustrates a location of a reference signal or a PDCCH according to an embodiment of the present disclosure.
Figure 11:
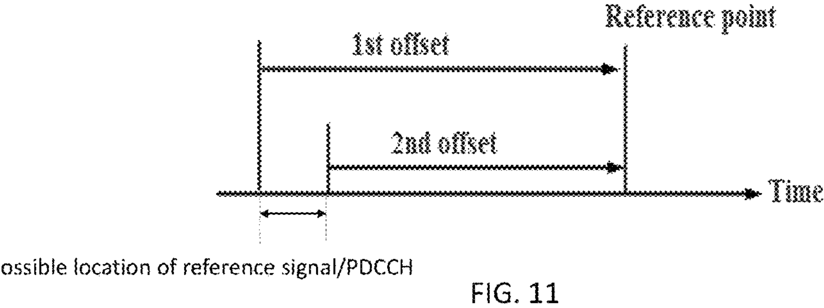
FIG. 11 illustrates a location of a reference signal or a PDCCH according to another embodiment of the present disclosure.

In some embodiments, the location of the reference signal or PDCCH in the time domain is determined by a first offset relative to a third predefined reference point or a first and second offset relative to a third predefined reference point. The location of the reference signal or PDCCH in the time domain is illustrated in FIGS. 10 and 11.

In some embodiments, the location of the reference signal or PDCCH in the time domain is determined by a window corresponding to at least two of a starting position and an end position of the reference signal in the time domain and a duration of the resource of the reference signal in the time domain.

Figure 12:
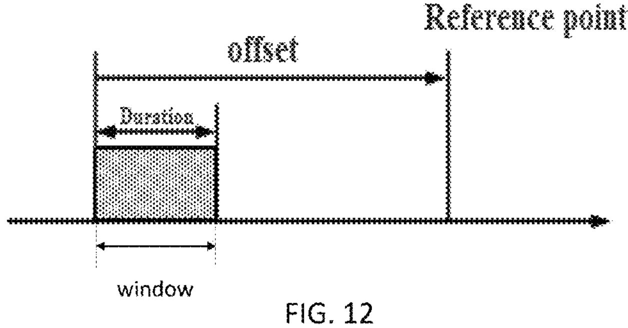
FIG. 12 illustrates a determination of a window according to an embodiment of the present disclosure.

In some embodiments, the window is determined by a starting position and a duration as illustrated in FIG. 12.

Figure 13:
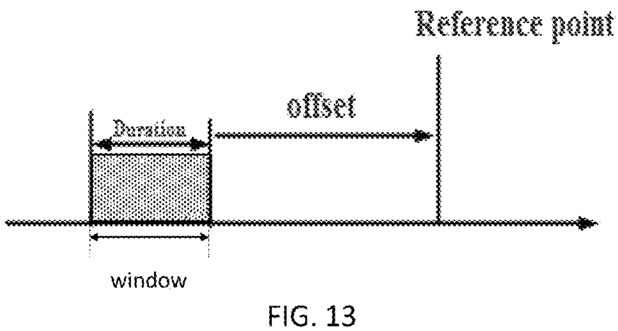
FIG. 13 illustrates a determination of a window according to another embodiment of the present disclosure.

In some embodiments, the window is determined by an end position and a duration as illustrated in FIG. 13.

Figure 14:
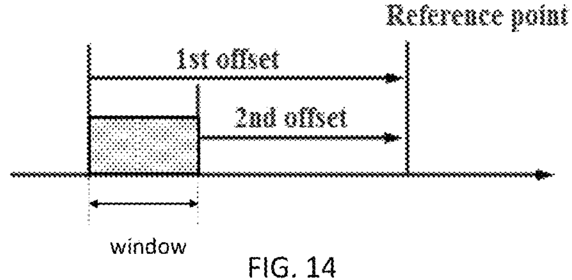
FIG. 14 illustrates a determination of a window according to still another embodiment of the present disclosure.

In some embodiments, the window is determined by a starting position and an end position as illustrated in FIG. 14.

In some embodiments, the starting position and/or end position of the window is defined by an offset relative to a third predefined reference point.

In some embodiments, the third predefined reference point is determined by higher layer signaling or predetermined.

In some embodiments, the third predefined reference point is determined by at least one of the following:

- the paging period;
- the PSS, the SSS, or the SS/PBCH block;
- the paging indication or a resource for the paging indication;
- an ID of the wireless communication node or S-Temporary Mobile Subscriber Identity (S-TMSI) of the wireless communication node;
- an ID of the resource of the reference signal; or
- a group ID of the wireless communication node.

In some embodiments, the location of the reference signal or PDCCH in the time domain is associated with a paging frame. In some embodiments, the location of the reference signal or PDCCH in the time domain is determined by at least one offset relative to the paging frame.

In some embodiments, the location of the reference signal or PDCCH in the time domain is associated with the paging frame and at least one of the PSS, the SSS, or the SS/PBCH block. In some embodiments, the reference signal or PDCCH in the time domain is located between the paging frame and the PSS, the SSS, or the SS/PBCH block.

In some embodiments, the paging frame is a predefined paging frame or a paging frame determined by a higher layer signaling or paging frame where the wireless communication node monitors the paging DCI.

In some embodiments, the paging frame is a predefined paging frame or a paging frame determined by a higher layer signaling or a paging frame where the wireless communication node monitors the paging information during a first period. In some embodiments, the predefined or configured paging frame is the i-th paging frame within the first period, in which i is a positive number. For example, the predefined or configured paging frame is the first or last paging frame within the first period.

In some embodiments, the location of the reference signal or PDCCH in the time domain is associated with a paging occasion. In some embodiments, the location of the reference signal or PDCCH in the time domain is determined by at least one offset relative to the paging occasion.

In some embodiments, the location of the reference signal or PDCCH in the time domain is associated with the paging occasion and at least one of the PSS, the SSS, or the SS/PBCH block. In some embodiments, the reference signal or PDCCH in the time domain is located between the paging occasion and the PSS, the SSS, or the SS/PBCH block.

In some embodiments, the paging occasion is a predefined paging occasion or a paging occasion determined by a higher layer signaling or paging occasion where the wireless communication node monitors the paging DCI.

In some embodiments, the paging occasion is a predefined paging occasion or a paging occasion determined by a higher layer signaling or a paging occasion where the wireless communication node monitors the paging DCI during a second period. In some embodiments, the predefined or configured paging occasion is the i-th paging occasion within the second period, in which i is a positive number. For example, the predefined or configured paging occasion is the first or last paging occasion within the second period.

In some embodiments, the location of the reference signal/PDCCH in the time domain is determined by at or associated with the PSS, SSS, or SSB.

In some embodiments, the location of the reference signal/PDCCH in the time domain is determined by at least one offset relative to the PSS, SSS, or SSB.

In some embodiments, the location of the reference signal/PDCCH in the time domain is determined by or associated with the PSS, SSS, or SSB during a third period.

In some embodiments, the PSS, SSS, or SSB is a predefined SSS/PSS/SSB or an SSS/PSS/PSS configured by higher layer signaling. In some embodiments, the PSS, SSS, or SSB is a predefined SSS/PSS/SSB or an SSS/PSS/PSS configured by a higher layer signaling before the paging frame or paging occasion.

In some embodiments, the location of the reference signal/PDCCH in the time domain is determined by at or associated with the paging indication or the resource configured for the paging indication.

In some embodiments, the location of the reference signal/PDCCH in the time domain is determined by at least one offset relative to the paging indication or the resource configured for the paging indication.

In some embodiments, the location of the reference signal/PDCCH in the time domain is determined by at or associated with a third predefined reference point.

In some embodiments, the location of the reference signal/PDCCH in the time domain is determined by at least one offset relative to a third predefined reference point. In some embodiments, the third predefined reference point is the start or end of a system frame, a paging cycle or a paging time window.

In some embodiments, the location of the reference signal/PDCCH includes at least one of the following: the starting position of the reference signal/PDCCH, the end position of the reference signal/PDCCH, or a duration (e.g., the duration for transmission) of the reference signal/PDCCH.

In some embodiments, the first period or the second period or the third period mentioned above contains one or more of the paging frame, the paging cycle, a portion of paging cycle, the system frame, and a paging hyper frame. In some embodiments, the first period or the second period is in the unit of one of frame, subframe, slot or millisecond. In some embodiments, the number of frames within the first period or the second period divides by 32. In some embodiments, the number of frames within the first period or the second period includes a multiple of 4. In some embodiments, the first period or the second period or the third period contains a portion of a paging cycle. For example, the paging cycle is divided into N portions, and N is a positive number.

In some embodiments, the location of the reference signal/PDCCH in the time domain is also determined by at least one of a periodicity and the third offset; or the duration of the reference signal/PDCCH.

In some embodiments, the location of the reference signal/PDCCH may be determined by a periodicity, a third offset, and the first/second/at least one offset relative to a third predefined reference point. In this embodiment, the first/second/at least one offset relative to the third predefined reference point may be regarded as a "mask", which determines the "valid" resource for the reference signal and PDCCH transmission.

In some embodiments, the location of the reference signal/PDCCH may be determined by a periodicity, a third offset, a duration, and the first/second/at least one offset relative to a third predefined reference point.

In some embodiments, the location of the reference signal/PDCCH includes the start and/or end position of the reference signal/PDCCH.

In these embodiments, the location of the reference signal/PDCCH is associated with the paging occasion/paging frame/SSS/PSS/PBCH, the number of UE wake-up times can be reduced to saving power, but the implementation is not limited to thereto.

Aspect 6—Format/Information conveyed by Reference Signal/PDCCH

In some embodiments, the paging information conveyed by the reference signal or PDCCH includes at least one of a paging indicator (or paging indication), an activation/de-activation/update indicator, or a system information notification.

In some embodiments, the paging indicator is used to indicate the wireless communication node whether to detect the paging DCI and/or paging message. In some embodiments, the paging indication indicates the wireless communication node at least one of the following:

- whether to detect the PDCCH with CRC bits scrambled by P-RNTI;
- whether to detect the PDCCH scheduling paging message;
- whether to monitor the paging occasion;
- whether to detect the paging DCI;
- whether to monitor the paging occasion for paging message; or
- whether to receive the paging message.

In some embodiments, the activation/de-activation/update indicator used to activate or de-activate or update a resource of configured reference signal or a resource set of the configured reference signal. In some embodiments, the configured reference signal is at least one of CSI-RS, TRS, or SS/PBCH. In some embodiments, the activation/de-activation/update of the configured reference signal is associated with a reference signal resource or a reference signal resource set.

In some embodiments, the configured reference signal or PDCCH includes at least one of the following:

- an activation/de-activation/update field;
- reference signal resource information for a configured reference signal or reference signal resource set information for the configured reference signal; or
- a Transmission Configuration Indicator (TCI) state field.

In some embodiments, the activation/de-activation/update field indicates whether to activate or deactivate or update a configured reference signal resource or configured reference signal resource set. For example, if the field is set to 1, it indicates activation, and if the field is set to 0, it indicates deactivation. In another example, if the field is set to 0, it indicates activation, and if the field is set to 1, it indicates deactivation.

In some embodiments, the configured reference signal resource or the reference signal resource set to be activated/de-activated/updated is determined by the reference signal resource information or reference signal resource set information for the configured reference signal determined by a higher layer signaling and the PDCCH.

In some embodiments, the configured reference signal resource or the reference signal resource set to be activated/de-activated/updated is determined by the reference signal resource information or reference signal resource set information for the configured reference signal determined by a higher layer signaling and the reference signal.

In some embodiments, the reference signal resource information or reference signal resource set information for the configured reference signal is a reference signal resource ID or reference signal resource set ID.

In some embodiments, a code point of i indicated by the reference signal or PDCCH indicates the (i+1)-th configured reference signal resource or configured reference signal resource set configured by the higher layer signaling, in which i is a non-negative number.

In some embodiments, the reference signal resource ID information or reference signal resource set ID information for the configured reference signal is in a bitmap format. For example, a bit in the bitmap indicates the activation/de-activation/update of the associated configured reference signal resource or configured reference signal resource set. For example, a bit in the bitmap indicates the activation/de-activation/update of the associated a group of the configured reference signal resources or configured reference signal resource sets.

In some embodiments, the reference signal resource ID information or reference signal resource set ID information for the configured reference signal is in a group ID of the configured reference signal source or configured reference signal source set. For example, the configured reference signal source or configured reference signal source set can be divided into one or more groups, an indication of a group ID can activate/de-activated/updated multiple configured reference signal resource or configured reference set.

In some embodiments, the reference signal resource information or reference signal resource set information for the configured reference signal is a triggering state. In some embodiments, the triggering state is associated with the configured reference signal resource or configured reference signal resource set. For example, all the configured reference signal resources or configured reference signal resource sets having the same triggering state as it is indicated by the reference signal or PDCCH is activated/de-activated/updated. In this embodiments, multiple configured reference signal resource or configured reference signal resource set can be configured with the same triggering state, then an indication of a triggering state can activate/de-activated/updated multiple configured reference signal resource or configured reference signal resource set.

In some embodiments, the TCI state field is used to indicate the QCL source of the configured reference signal resource or configured reference signal resource set.

In some embodiments, if the activation or de-activation or update information of the configured reference signal is detected, the configured reference signal will not be activated or de-activated or update in the subsequent modification period.

In some embodiments, the modification period boundaries are defined by values of the System Frame Number (SFN) for which SFN mod M=0, in which M is the number of radio frames.

In some embodiments, the system information notification includes at least one of short messages, natural catastrophe warning system notification (e.g., an Earthquake and Tsunami Warning System (ETWS)), or Commercial Mobile Alert System notification (CMAS).

In some embodiments, the system information notification may be a field including at least one of the short messages, or the ETWS notification or the CMAS notification.

In some embodiments, the short messages are as illustrated in the table 2 below.

TABLE 2 short messages

| Bit in the short message | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>If set to 1: stop monitoring PDCCH occasions(s) for paging in this Paging Occasion. |
| 4-8 | May be ignored by UE if received. |

In some implementations, the configured reference signal may a reference signal used by UE for synchronization or RRM measurement in addition to SS/PBCH to reduce UE power consumption, but not limited to thereto. A dynamic activation/de-activation/update of the configured reference signal conveyed by the PDCCH or reference signal is beneficial to UE energy efficiency and also network resource overhead. For example, it is more flexible for network to activate/de-activate/update of the configured reference signal.

For RRC idle or inactive state UE, it also needs to detect paging DCI for system information notification or warning notification if the said reference signal or PDCCH only conveys the paging indicator. Hence, to further reduce UE power saving, reference signal or PDCCH may also needs to convey the system information notification or warning notification.

In the following paragraphs, two examples are provided to describe details of the information conveyed by the reference signal or the PDCCH.

Example 1

In some embodiments, the information block conveyed by the reference signal or the PDCCH includes a first block, a second block, and one or more third blocks. In some embodiments, the information block conveyed by the reference signal or PDCCH includes a second block, a first block, and one or more third blocks.

In some embodiments, the first block is the activation/deactivation/update of a reference signal field.

In some embodiments, the second block is the system information notification field.

In some embodiments, the third block is the paging indicator field.

In some embodiments, the position and/or the block length of the first/second/third block is predefined or determined by a higher layer parameter.

In some embodiments, the position and block length of the first and second block are predefined. In some embodiments, the position and the block length of the third block is determined by a higher layer parameter. In these embodiments, as the block lengths of the first and second block may be fixed, the one or more third blocks are located subsequent to the first and second blocks, and the resource overhead of the configuration of the reference signal or PDCCH may be reduced.

Example 2

In some embodiments, the information block conveyed by the reference signal or PDCCH includes a first block, and one or more third blocks. In some embodiments, the information block conveyed by the reference signal or PDCCH includes a second block, and one or more third blocks. The contents of the first, second, third blocks may be ascertained by reference to the paragraphs above.

Aspect 7—Number of Reference Signal Resource or Resource Set

In some embodiments, the wireless communication node is configured with more than Z reference signal resources or reference signal resource sets, in which Z is an integer.

In some embodiments, Z is associated with at least one of the following:

- a frequency range;
- a subcarrier spacing;
- a category or type of wireless communication node (e.g., UE category or UE type);
- a number of groups of wireless communication nodes; or
- a capability of the wireless communication node (e.g., a UE capability).

In some embodiments, the capability of the wireless communication node is a mandatory capability associated with CSI-RS. In some embodiments, Z is 8 for Frequency Range 1 (FR1) and 16 for Frequency Range 2. In some case, for the maximum number of TRS resource sets configured to UE per component carrier (CC), it is mandated to report at least 8 for FR1 and 16 for FR2. This mandatory capability may be reused to restriction the maximum number of CSI-RS resource set.

Aspect 8—Ports and Density

In some embodiments, the number of ports of the reference signal or PDCCH is predefined or configured by a higher layer signaling. In some embodiments, the number of the ports of the reference signal is predefined as X.

In some embodiments, the wireless communication node is configured to have a number of ports of the reference signal or PDCCH not larger than X, in which X is a positive number. In some embodiments, X is less than 5. For example, X=1.

In some embodiments, the density of the reference signal resource is predefined or configured by a higher layer signaling. In some embodiments, the density of the reference signal resource is predefined as Y In some embodiments, the wireless communication node is configured to have a density of the reference signal resource not smaller than Y, in which Y is a positive number. For example, Y=1 or 3.

In some embodiments, the wireless communication node is configured to assume that all the CSI-RS resources are configured with the same density.

In some embodiments, the wireless communication node is configured to assume that all the CSI-RS resources are configured with the same number of ports.

Figure 15:
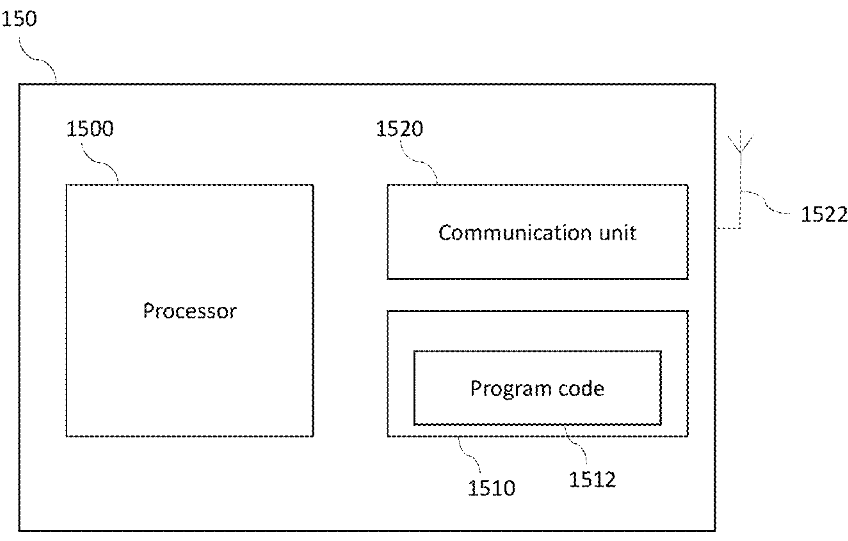
FIG. 15 shows a schematic diagram of a wireless communication node according to an embodiment of the present disclosure.

FIG. 15 relates to a schematic diagram of a wireless communication node 150 (e.g., a wireless terminal) according to an embodiment of the present disclosure. The wireless communication node 150 may be a user equipment (UE), a mobile phone, a laptop, a tablet computer, an electronic book or a portable computer system and is not limited herein. The wireless communication node 150 may include a processor 1500 such as a microprocessor or Application Specific Integrated Circuit (ASIC), a storage unit 1510 and a communication unit 1520. The storage unit 1510 may be any data storage device that stores a program code 1512, which is accessed and executed by the processor 1500. Embodiments of the storage unit 1510 include but are not limited to a subscriber identity module (SIM), read-only memory (ROM), flash memory, random-access memory (RAM), hard-disk, and optical data storage device. The communication unit 1520 may a transceiver and is used to transmit and receive signals (e.g. messages or packets) according to processing results of the processor 1500. In an embodiment, the communication unit 1520 transmits and receives the signals via at least one antenna 1522.

In an embodiment, the storage unit 1510 and the program code 1512 may be omitted and the processor 1500 may include a storage unit with stored program code.

The processor 1500 may implement any one of the steps in exemplified embodiments on the wireless communication node 150, e.g., by executing the program code 1512.

The communication unit 1520 may be a transceiver. The communication unit 1520 may as an alternative or in addition be combining a transmitting unit and a receiving unit configured to transmit and to receive, respectively, signals to and from a network device.

In some embodiments, the wireless communication node 150 may be used to perform the operations described above (e.g., operations in the method 100 and/or the method 200, and other relevant operations). In some embodiments, the processor 1500 and the communication unit 1520 collaboratively perform the operations described above. For example, the processor 1500 performs operations and transmit or receive information through the communication unit 1520.

In an embodiment, the processor 1500 is configured to detect a reference signal or a PDCCH from a network device. In an embodiment, the reference signal or the PDCCH is used to indicate at least the paging information to the wireless communication node.

In another embodiment, the processor 1500 is configured to detect a reference signal from a network device. In an embodiment, the reference signal is used by the wireless communication node for synchronization or RRM measurement.

Details of operations of the wireless communication node 150 may be ascertained with reference to the embodiments above, and will not be described herein.

Figure 16:
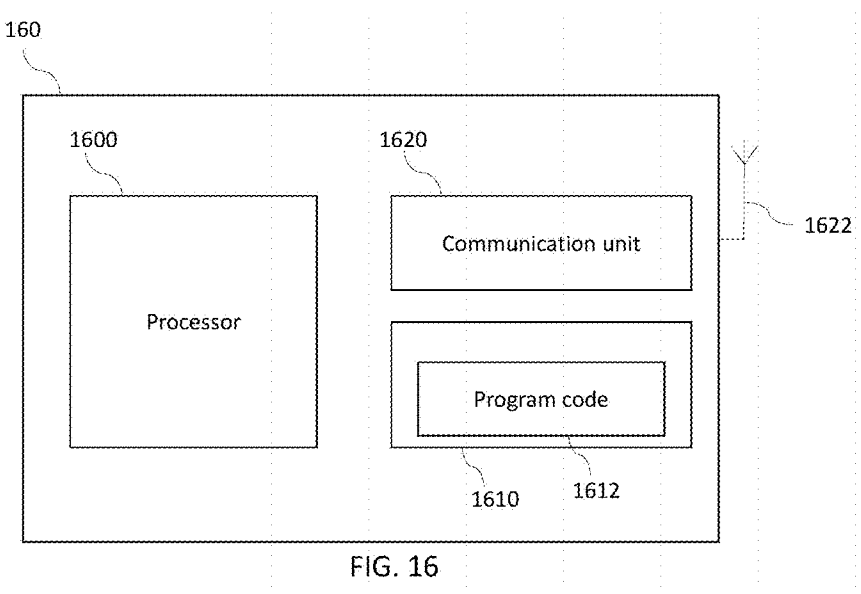
FIG. 16 shows a schematic diagram of a network device according to an embodiment of the present disclosure.

FIG. 16 relates to a schematic diagram of a network device according to an embodiment of the present disclosure. The network device 160 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the network device 160 may include (perform) at least one network function such as an access and mobility management function (AMF), a session management function (SMF), a user place function (UPF), a policy control function (PCF), an application function (AF), etc. The network device 160 may include a processor 1600 such as a microprocessor or ASIC, a storage unit 1610 and a communication unit 1620. The storage unit 1610 may be any data storage device that stores a program code 1612, which is accessed and executed by the processor 1600. Examples of the storage unit 1610 include but are not limited to a SIM, ROM, flash memory, RAM, hard-disk, and optical data storage device. The communication unit 1620 may be a transceiver and is used to transmit and receive signals (e.g. messages or packets) according to processing results of the processor 1600. In an example, the communication unit 1620 transmits and receives the signals via at least one antenna 1622. In an embodiment, the communication unit 1620 may also transmit and receive the signals via physical wires/cables.

In an embodiment, the storage unit 1610 and the program code 1612 may be omitted. The processor 1600 may include a storage unit with stored program code.

The processor 1600 may implement any steps described in exemplified embodiments on the network device 160, e.g., via executing the program code 1612.

The communication unit 1620 may be a transceiver. The communication unit 1620 may as an alternative or in addition be combining a transmitting unit and a receiving unit configured to transmit and to receive, respectively, signals to and from a communication device (e.g. a user equipment).

In some embodiments, the network device 160 may be used to perform the operations described above (e.g., operations in the method 300 and/or the method 400, and other relevant operations). In some embodiments, the processor 1600 and the communication unit 1620 collaboratively perform the operations described above. For example, the processor 1600 performs operations and transmit or receive signals through the communication unit 1620.

In an embodiment, the processor 1600 is configured to transmit a reference signal or a PDCCH to a wireless communication node. In an embodiment, the reference signal or the PDCCH is used to indicate at least the paging information to the wireless communication node.

In another embodiment, the processor 1600 is configured to transmit a reference signal to a wireless communication node. In an embodiment, the reference signal is used by the wireless communication node for synchronization or RRM measurement.

Details of operations of the network device 160 may be ascertained with reference to the embodiments above, and will not be described herein.

Another aspect of the present disclosure relates to a computer program product including a computer-readable program medium code stored thereupon, the code, when executed by a processor, causing the processor to implement a wireless communication method recited in any of foregoing methods.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of an embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:

detecting, by a wireless communication node from a network device, a physical downlink control channel (PDCCH);

wherein the PDCCH is used to indicate at least paging information to the wireless communication node;

wherein the location of the PDCCH in the time domain is associated with a paging frame and at least one offset relative to the paging frame, wherein the PDCCH further comprises an activation or update indicator used to activate or update a resource set of a configured reference signal;

wherein the updated or activated resource set of the configured reference signal is determined by reference signal resource information for the configured reference signal determined by a higher layer signaling or the PDCCH, or the updated or activated resource set of the configured reference signal is determined by reference signal resource set information for the configured reference signal determined by a higher layer signaling or the PDCCH; and wherein the reference signal resource set information is in a bitmap format, a bit in the bitmap indicates an activation or update of an associated configured reference signal resource set or an associated group of configured reference signal resource sets.

2. The wireless communication method of claim 1, wherein the PDCCH indicates whether the wireless communication node detects paging downlink control information (DCI).

3. The wireless communication method of claim 1, wherein the PDCCH is quasi co-located with a reference source, the reference source comprises a Synchronization Signal/Physical Broadcast Channel block determined by a higher layer signaling.

4. The wireless communication method of claim 1, wherein a location of the PDCCH in the time domain is determined by a higher layer signaling.

5. The wireless communication method of claim 1, wherein the configured reference signal is a Tracking Reference Signal (TRS).

6. The wireless communication method of claim 1, wherein the reference signal resource set information is a reference signal resource set identifier.

7. A wireless communication method comprising:

transmitting, by a network device to a wireless communication node, a physical downlink control channel, PDCCH;

wherein the PDCCH is used to indicate at least the paging information to the wireless communication node;

wherein the location of the PDCCH in the time domain is associated with a paging frame and at least one offset relative to the paging frame, wherein the PDCCH further comprises an activation or update indicator used to activate or update a resource set of a configured reference signal;

wherein the updated or activated resource set of the configured reference signal is determined by reference signal resource information for the configured reference signal determined by a higher layer signaling or the PDCCH, or the updated or activated resource set of the configured reference signal is determined by reference signal resource set information for the configured reference signal determined by a higher layer signaling or the PDCCH; and wherein the reference signal resource set information is in a bitmap format, a bit in the bitmap indicates an activation or update of an associated configured reference signal resource set or an associated group of configured reference signal resource sets.

8. The wireless communication method of claim 7, wherein the PDCCH indicates whether the wireless communication node detects paging downlink control information, DCI.

9. The wireless communication method of claim 7, wherein the PDCCH is quasi co-located with a reference source, the reference source comprises a Synchronization Signal/Physical Broadcast Channel block determined by a higher layer signaling.

10. The wireless communication method of claim 7, wherein the location of the PDCCH in the time domain is determined by a higher layer signaling.

11. The wireless communication method of claim 7, wherein the configured reference signal is a Tracking Reference Signal (TRS).

12. The wireless communication method of claim 7, wherein the reference signal resource set information is a reference signal resource set identifier.

13. A wireless communication node, comprising:

a communication unit, configured to communicate with a network device; and a processor configured to detect a physical downlink control channel, PDCCH, from the network device, wherein the PDCCH is used to indicate at least the paging information to the wireless communication node, wherein the location of the PDCCH in the time domain is associated with a paging frame and at least one offset relative to the paging frame, wherein the PDCCH further comprises an activation or update indicator used to activate or update a resource set of a configured reference signal;

wherein the updated or activated resource set of the configured reference signal is determined by reference signal resource information for the configured reference signal determined by a higher layer signaling or the PDCCH, or the updated or activated resource set of the configured reference signal is determined by reference signal resource set information for the configured reference signal determined by a higher layer signaling or the PDCCH; and wherein the reference signal resource set information is in a bitmap format, a bit in the bitmap indicates an activation or update of an associated configured reference signal resource set or an associated group of configured reference signal resource sets.

14. The wireless communication method of claim 1, wherein the paging frame is a predefined paging frame or a paging frame where the wireless communication node monitors paging DCI, the predefined paging frame is a first paging frame within a first period, and the first period comprises one or more of paging frames.

15. The wireless communication method of claim 7, wherein the paging frame is a predefined paging frame or a paging frame where the wireless communication node monitors paging DCI, the predefined paging frame is a first paging frame within a first period, and the first period comprises one or more of paging frames.

16. The wireless communication node of claim 13, wherein the paging frame is a predefined paging frame or a paging frame where the wireless communication node monitors paging DCI, the predefined paging frame is a first paging frame within a first period, and the first period comprises one or more of paging frames.

* * * * *